United States Patent
Kwon et al.

(10) Patent No.: US 8,976,149 B2
(45) Date of Patent: Mar. 10, 2015

(54) CAPACITANCE SENSING APPARATUS AND METHOD, AND TOUCH SCREEN APPARATUS

(75) Inventors: Yong Il Kwon, Gyunggi-do (KR); Kyung Hee Hong, Gyunggi-do (KR); Sang Ho Lee, Gyunggi-do (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 166 days.

(21) Appl. No.: 13/607,919

(22) Filed: Sep. 10, 2012

(65) Prior Publication Data

US 2014/0009431 A1 Jan. 9, 2014

(30) Foreign Application Priority Data

Jul. 9, 2012 (KR) ......................... 10-2012-0074494

(51) Int. Cl.
*G06F 3/045* (2006.01)

(52) U.S. Cl.
USPC ........................................................ 345/174

(58) Field of Classification Search
CPC ............................... G06F 3/044; H03K 17/962
USPC ..................... 345/173–178; 178/18.01–19.07
See application file for complete search history.

(56) References Cited

U.S. PATENT DOCUMENTS

| | | | |
|---|---|---|---|
| 8,730,189 B2 * | 5/2014 | Mamba et al. | 345/173 |
| 2010/0060610 A1 | 3/2010 | Wu | |
| 2011/0242048 A1 | 10/2011 | Guedon et al. | |
| 2012/0050219 A1 * | 3/2012 | Lee et al. | 345/174 |
| 2012/0092297 A1 | 4/2012 | Han | |
| 2012/0218222 A1 * | 8/2012 | Shen et al. | 345/174 |
| 2013/0257785 A1 * | 10/2013 | Brown et al. | 345/174 |

FOREIGN PATENT DOCUMENTS

KR 10-2012-0040037 4/2012

\* cited by examiner

*Primary Examiner* — Michael Pervan
*Assistant Examiner* — Andrew Lee

(57) ABSTRACT

There is provided a capacitance sensing apparatus including: a driving circuit unit sequentially applying a driving signal to each of a plurality of first electrodes; a sensing circuit unit including a first integrating circuit detecting a first change in capacitance generated in a plurality of second electrodes by the driving signal and a second integrating circuit connected to another first electrode adjacent to the first electrode to which the driving signal is applied; and an operating unit connected to the sensing circuit unit to determine a touch input, wherein the second integrating circuit detects a second change in capacitance generated due to noise in the another first electrode, and the operating unit determines the touch input based on the first and second changes in capacitance.

15 Claims, 7 Drawing Sheets

CAPACITANCE SENSING APPARATUS AND METHOD, AND TOUCH SCREEN APPARATUS

CROSS-REFERENCE TO RELATED APPLICATIONS

This application claims the priority of Korean Patent Application No. 10-2012-0074494 filed on Jul. 9, 2012, in the Korean Intellectual Property Office, the disclosure of which is incorporated herein by reference.

BACKGROUND OF THE INVENTION

1. Field of the Invention

The present invention relates to a capacitance sensing apparatus and method, and a touch screen apparatus.

2. Description of the Related Art

A touch sensing apparatus such as a touch screen, a touch pad, or the like, an input apparatus integrated with a display apparatus to provide an intuitive input method to a user, has recently been widely used in various electronic apparatuses such as a portable phone, a personal digital assistant (PDA), a navigation device, or the like. Particularly, as demand for smart phones has grown in recent times, the use of a touch screen as a touch sensing apparatus capable of providing various input methods in a limited form factor has correspondingly increased.

Touch screens used in portable apparatuses may be largely classified as resistive-type touch screens and capacitive-type touch screens according to a method of sensing a touch input utilized therein. Here, capacitive-type touch screens have advantages in that they have a relatively long lifespan and various input methods and gestures may be used therewith, such that the use thereof has increased. Particularly, a multi-touch interface may more easily be implemented in capacitive-type touch screens as compared to resistive-type touch screens, such that a multi-touch interface is widely used in smart phones, and the like.

Capacitive-type touch screens include a plurality of electrodes having a predetermined pattern defining a plurality of nodes in which a change in capacitance is generated by a touch input. In the plurality of nodes distributed on a two-dimensional plane, a change in self-capacitance or a change in mutual-capacitance is generated by the touch input. Coordinates of the touch input may be calculated by applying a weighted average method, or the like, to the change in capacitance generated in the plurality of nodes. In order to accurately calculate the coordinates of the touch input, a technology capable of accurately sensing the change in capacitance generated by the touch input is required. However, in the case in which electrical noise is generated in a wireless communications module, a display apparatus, or the like, it may hinder the change in capacitance from being accurately sensed.

RELATED ART DOCUMENT (Patent Document 1) Korean Patent Laid-Opened Publication No. 2012-0040037
(Patent Document 2) US Patent Laid-Open Publication No. 2010/000060010

SUMMARY OF THE INVENTION

An aspect of the present invention provides a method of significantly reducing an influence of noise on a target capacitance change to be measured in the case in which noise is generated.

Another aspect of the present invention provides a capacitance sensing apparatus and method, and a touch screen apparatus capable of removing an influence of noise by integrating and outputting a voltage difference between an output voltage of a first integrating circuit connected to a second electrode and an output voltage of a second integrating circuit connected to a first electrode.

According to an aspect of the present invention, there is provided a capacitance sensing apparatus including: a driving circuit unit sequentially applying a driving signal to each of a plurality of first electrodes; a sensing circuit unit including a first integrating circuit detecting a first change in capacitance generated in a plurality of second electrodes by the driving signal and a second integrating circuit connected to another first electrode adjacent to the first electrode to which the driving signal is applied; and an operating unit connected to the sensing circuit unit to determine a touch input, wherein the second integrating circuit detects a second change in capacitance generated due to noise in the another first electrode, and the operating unit determines the touch input based on the first and second changes in capacitance.

The first integrating circuit may include a variable capacitor and a non-inverting amplifier, the variable capacitor being controlled to allow an output value of the non-inverting amplifier to be 0 when noise is not introduced thereto.

The second integrating circuit may invert and integrate the second change in capacitance.

The sensing circuit unit may further include a subtractor calculating a voltage difference between an output voltage of the first integrating circuit and an output voltage of the second integrating circuit.

The capacitance sensing apparatus may further include a controlling unit performing a control operation such that the driving signal is sequentially applied to the plurality of first electrodes and the second integrating circuit is connected to the another first electrode adjacent to the first electrode to which the driving signal is applied.

The operating unit may determine the touch input based on an output signal of the subtractor.

According to another aspect of the present invention, there is provided a capacitance sensing method including: applying a driving signal to at least one of a plurality of first electrodes; generating a first output voltage from a first change in capacitance generated in a plurality of second electrodes by the driving signal; generating a second output voltage from a second change in capacitance generated due to noise in another first electrode adjacent to the first electrode to which the driving signal is applied; calculating a voltage difference between the first and second output voltages; and determining a touch input based on the voltage difference.

The generating of the first output voltage may be performed by non-inverting and integrating the first change in capacitance.

The generating of the first output voltage may further include controlling a variable capacitor to allow the first output voltage to be 0 when noise is not introduced thereto.

The generating of the second output voltage may be performed by non-inverting and integrating the second change in capacitance.

According to another aspect of the present invention, there is provided a touch screen apparatus including: a panel unit including a plurality of driving electrodes and a plurality of sensing electrodes; a driving circuit unit applying a driving signal to each of the plurality of driving electrodes; a sensing circuit unit sensing changes in capacitance generated in intersections between the driving electrodes to which the driving signal is applied and the plurality of sensing electrodes; and a controlling unit controlling operations of the driving circuit unit and the sensing circuit unit, wherein the sensing circuit unit includes first and second integrating circuits, the first integrating circuit detecting a first change in capacitance generated in the sensing electrodes by the driving signal and the second integrating circuit detecting a second change in capacitance generated due to noise in another driving electrode adjacent to the driving electrode to which the driving signal is applied.

The first integrating circuit may include a variable capacitor and a non-inverting amplifier, the variable capacitor being controlled to allow an output value of the non-inverting amplifier to be 0.

The sensing circuit unit may calculate a voltage difference between an output voltage of the first integrating circuit and an output voltage of the second integrating circuit to generate an output signal to be input to the controlling unit.

The controlling unit may perform a control operation so that the second integrating circuit is connected to the another driving electrode adjacent to the driving electrode to which the driving signal is applied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
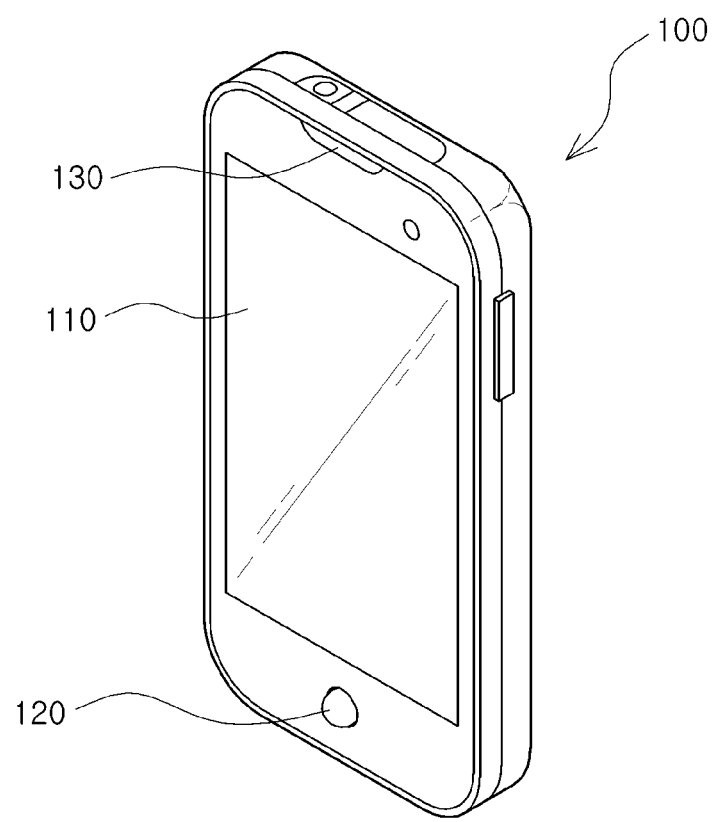
FIG. 1 is a perspective view showing an exterior of an electronic apparatus including a touch screen apparatus according to an embodiment of the present invention.

Embodiments of the present invention will hereinafter be described in detail with reference to the accompanying drawings. These embodiments will be described in detail in order to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and scope of the present invention. In addition, it should be understood that positions and arrangements of individual components in each embodiment may be changed without departing from the spirit and scope of the present invention. Therefore, a detailed description provided below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, embodiments of the present invention will be described in detail with reference to the accompanying drawings so that those skilled in the art may easily practice the present invention.

FIG. 1 is a perspective view showing an exterior of an electronic apparatus including a touch screen apparatus according to an embodiment of the present invention. Referring to FIG. 1, an electronic apparatus 100 according to the embodiment of the present invention may include a display apparatus 110 for outputting an image, an input unit 120, an audio unit 130 for outputting audio, and a touch screen apparatus integrated with the display apparatus 110.

As shown in FIG. 1, in the case of a mobile apparatus, the touch screen apparatus may be generally provided in a state in which it is integrated with the display apparatus and needs to have light transmissivity high enough to allow the image displayed by the display apparatus to be transmitted therethrough. Therefore, the touch screen apparatus may be implemented by forming sensing electrodes formed of a transparent, electrically conductive material such as indium-tin oxide (ITO), indium zinc oxide (IZO), zinc oxide (ZnO), carbon nano tube (CNT), or graphene on a base substrate formed of a transparent film material such as polyethylene terephthalate (PET), polycarbonate (PC), polyethersulfone (PES), polyimide (PI), or the like. A wiring pattern connected to the sensing electrodes formed of the transparent conductive material is disposed in a bezel region of the display apparatus 110, and is visually shielded by the bezel region, and thus the wiring pattern may be formed of a metal material such as silver (Ag), copper (Cu), or the like.

Since it is assumed that the touch screen apparatus according to the embodiment of the present invention is operated in a capacitive scheme, the touch screen apparatus may include a plurality of electrodes having a predetermined pattern. In addition, the touch screen apparatus according to the embodiment of the present invention may include a capacitance sensing apparatus for detecting a change in capacitance generated in the plurality of electrodes. Hereinafter, a capacitance sensing apparatus and a method of operation thereof according to an embodiment of the present invention will be described with reference to FIGS. 2 through 4.

Figure 2:
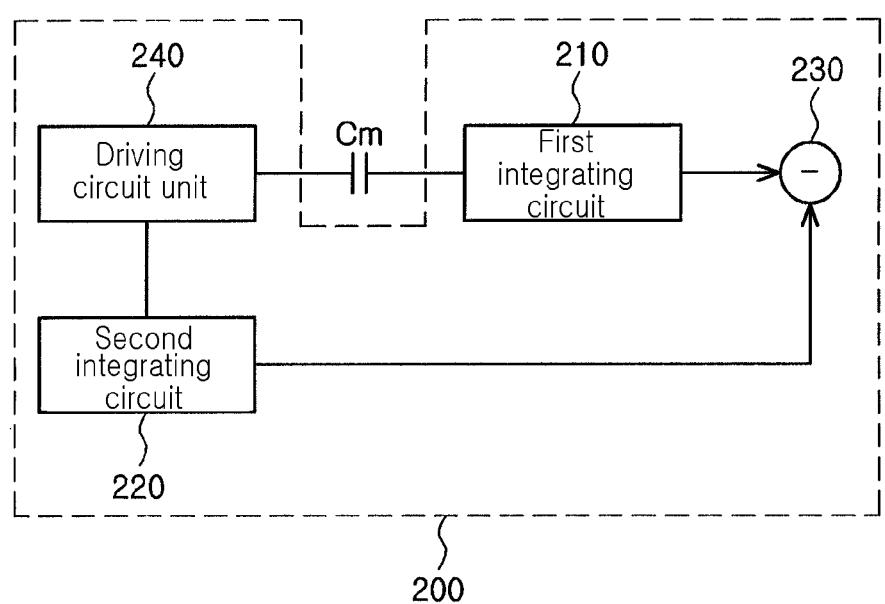
FIG. 2 is a block diagram showing a capacitance sensing apparatus according to an embodiment of the present invention.

FIG. 2 is a block diagram showing a capacitance sensing apparatus according to an embodiment of the present invention. Referring to FIG. 2, a capacitance sensing apparatus 200 according to the embodiment of the present invention may include a driving circuit unit 240, a first integrating circuit 210, a second integrating circuit 220, and a subtractor 230. A capacitor Cm in which a target change in capacitance to be measured is generated may be connected between the driving circuit unit 240 and the first integrating circuit 210.

In FIG. 2, the capacitor Cm may correspond to a capacitor in which the target capacitance to be measured by the capacitance sensing apparatus 200 according to the embodiment of the present invention is charged. As an example, the capacitance of the capacitor Cm may correspond to mutual capacitance generated between a plurality of electrodes included in a capacitive-type touch screen. Hereinafter, for convenience of explanation, it is assumed that the capacitance sensing apparatus 200 according to the embodiment of the present invention senses a change in capacitance generated in the capacitive-type touch screen. In this case, the capacitor Cm may be a node capacitor where charges are charged or discharged according to a change in mutual capacitance generated in intersections between the plurality of electrodes.

The driving circuit unit 240 may generate a predetermined driving signal for charging the capacitor Cm with the charges and supply the driving signal to the capacitor Cm. The driving signal may be a square wave signal having a pulse form and a predetermined frequency.

The first integrating circuit 210 may include one or more capacitors charged or discharged by the capacitor Cm. The first integrating circuit 210 may generate an output voltage from an amount of charge in or discharged from the capacitor. That is, the output voltage of the first integrating circuit 210 may be determined according to the capacitance of the capacitor Cm, the capacitance of the capacitor included in the first integrating circuit 210, a voltage level of the driving signal, and the like. At least one of the capacitors included in the first integrating circuit 210 may be a variable capacitor in which a capacitance value may be controlled to allow the output voltage of the first integrating circuit 210 to be 0 in the case in which noise is introduced.

The second integrating circuit 220 may be connected to the driving circuit unit and include one or more capacitors. The capacitors included in the second integrating circuit 220 may be charged or discharged according to a change in capacitance generated due to noise in a first electrode to which the driving signal is applied. The first and second integrating circuits 210 and 220 may include a plurality of switches. Operations of the plurality of switches may be controlled to control operations of the first and second integrating circuits 210 and 220.

The subtractor 230 may be connected between the first and second integrating circuits 210 and 220 and calculate a difference between an output voltage of the first integrating circuit 210 and an output voltage of the second integrating circuit 220 to generate an output signal.

Figure 3:
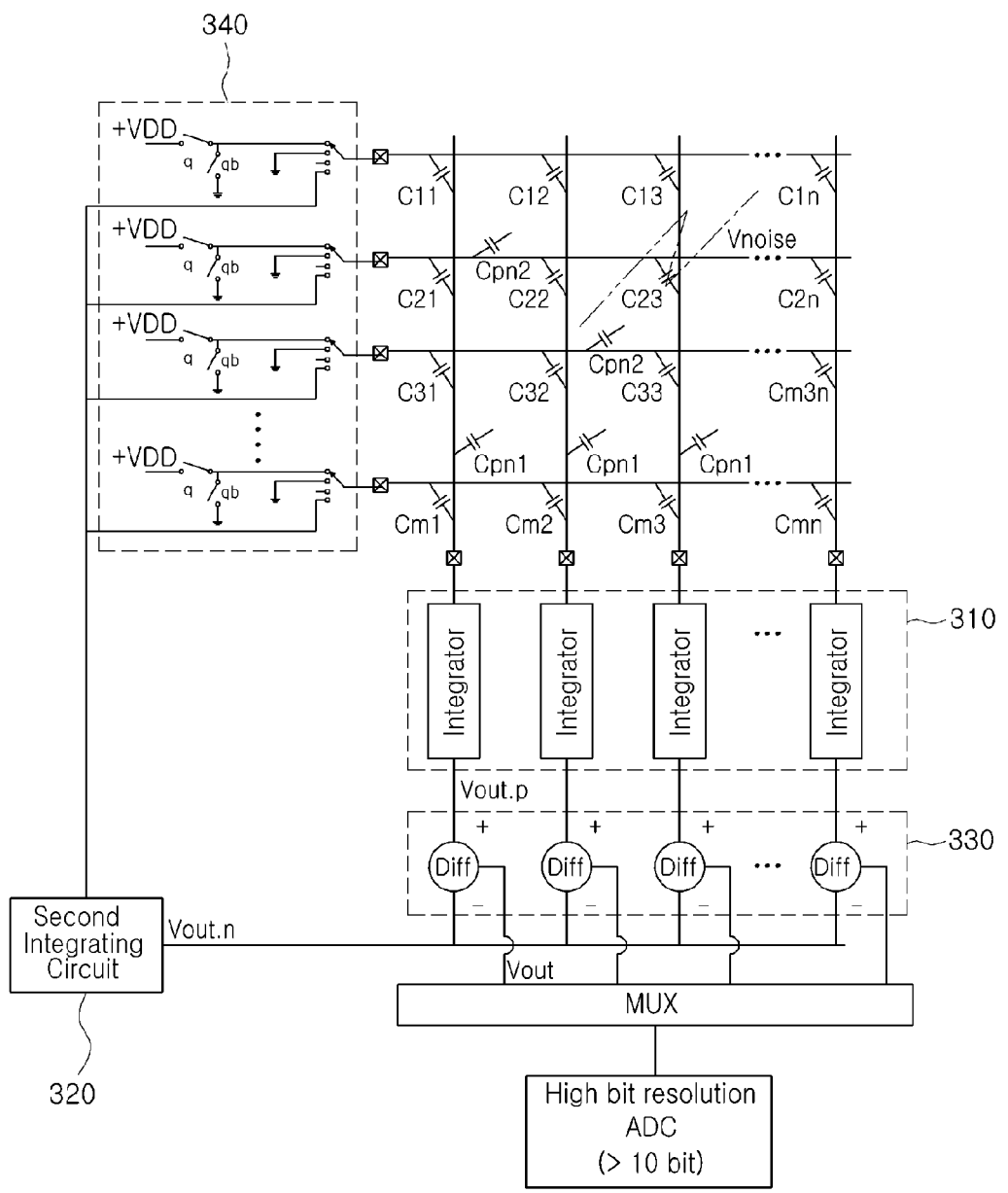
FIG. 3 is a view showing a touch screen apparatus including a capacitance sensing apparatus according to an embodiment of the present invention.

FIG. 3 is a view showing a touch screen apparatus including a capacitance sensing apparatus according to an embodiment of the present invention.

Referring to FIG. 3, the touch screen apparatus according to the embodiment of the present invention may include a panel unit, a driving circuit unit 340, a first integrating circuit 310, a second integrating circuit 320, a subtractor 330, a signal converting unit (a high bit resolution analog to digital converter (ADC)), and an operating unit (not shown). The panel unit may include a plurality of first electrodes extended in a first axial direction, that is, a horizontal direction of FIG. 3 and a plurality of second electrodes extended in a second axial direction, that is, a vertical direction of FIG. 3, intersecting with the first axial direction. Here, changes in capacitance C11 to Cmn are generated in intersections between the first and second electrodes. The changes in capacitance C11 to Cmn generated in the intersections between the first and second electrodes may be changes in mutual capacitance generated by a driving signal applied to the first electrodes by the driving circuit unit 340. Further, in the case in which noise Vnoise is introduced into the panel unit, changes in parasitic capacitance Cpn1 and Cpn2 may be generated in the first and second electrodes. The change in parasitic capacitance Cpn1 may be generated between the first electrode and the noise Vnoise and the change in parasitic capacitance Cpn2 may be generated between the second electrode and the noise Vnoise. Meanwhile, the driving circuit unit 340, the first integrating circuit 310, the second integrating circuit 320, the subtractor 330, the signal converting unit, and the operating unit may be implemented as a signal integrated circuit (IC).

The driving circuit unit 340 may apply a predetermined driving signal to the first electrodes of the panel unit or connect the second integrating circuit part 320 detecting an amount of change in capacitance generated due to noise in the first electrodes to the first electrodes. The driving signal may be a square wave signal, a sine wave signal, a triangle wave signal, or the like, having a predetermined period and amplitude and be sequentially applied to each of the plurality of first electrodes. Although FIG. 3 shows that circuits for the generation and application of the driving signal are individually connected to the plurality of first electrodes, a single driving signal generating circuit may be provided to apply a driving signal to each of the plurality of first electrodes using switching circuits.

The first integrating circuit 310 may include integrating circuits for sensing the changes in capacitance C11 to Cmn from the second electrodes. Each of the integrating circuits may include at least one operational amplifier and a capacitor C1 having a predetermined capacitance, wherein each of the operational amplifiers has an inverting input terminal connected to the second electrode to convert the changes in capacitance C11 to Cmn into an analog signal such as a voltage signal, or the like, and then output the analog signal. In the case in which the driving signal is sequentially applied to the plurality of first electrodes, since the changes in capacitance may be simultaneously detected from the plurality of second electrodes, the number of integrating circuits may correspond to the number (m) of second electrodes.

The second integrating circuit 320 may include integrating circuits for sensing the changes in capacitance generated due to noise from the first electrodes. Each of the integrating circuits may include at least one operational amplifier and a capacitor having a predetermined capacitance, wherein each of the operational amplifiers has an inverting input terminal connected to the first electrode to convert the changes in capacitance into an analog signal such as a voltage signal, or the like, and then output the analog signal. In the case in which the driving signal is sequentially applied to each of the plurality of first electrodes, the second integrating circuit 320 may be connected to a first electrode adjacent to the first electrode to which the driving signal is applied, thereby detecting the change in capacitance.

The subtractor 330 may be connected between the first and second integrating circuits 310 and 320 and calculate a voltage difference between an output voltage of the first integrating circuit 310 and an output voltage of the second integrating circuit 320.

The signal converting unit may generate a digital signal $S_D$ from an analog signal generated by the subtractor 330. For example, the signal converting unit may include a time-to-digital converter (TDC) circuit measuring a time required for a voltage type analog signal outputted from the subtractor 330 to reach a predetermined reference voltage level and converting the measured time into a digital signal $S_D$ or an analog-to-digital converter (ADC) circuit measuring a variation in a level of an analog signal outputted from the subtractor 330 for a predetermined time and converting the measured variation into a digital signal $S_D$.

The operating unit (not shown) may determine a touch input applied to the panel unit using the digital signal $S_D$. As an example, the operating unit may determine the number, coordinates, gesture operations, or the like, of touch inputs applied to the panel unit.

Figure 4:
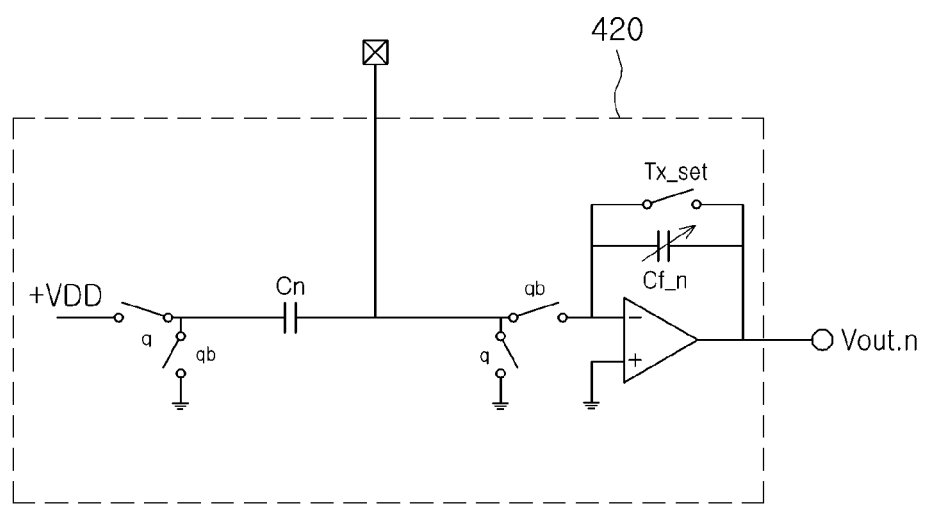
FIGS. 4 and 5 are circuit diagrams showing the capacitance sensing apparatus of FIG. 3.
Figure 5:
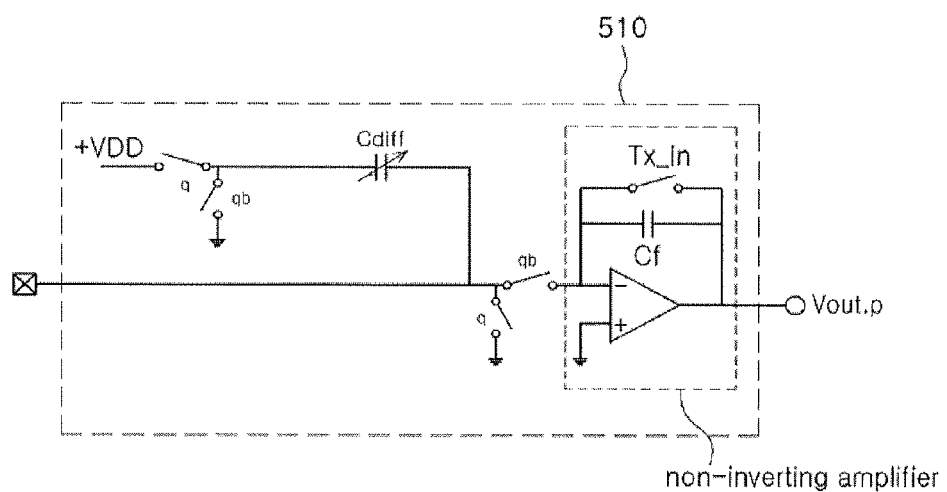

FIGS. 4 and 5 are circuit diagrams showing a second integrating circuit and a first integrating circuit of FIG. 3 in detail.

Referring to FIG. 4, a second integrating circuit 420 may include a capacitor Cn. A first node of the capacitor Cn may be connected to switches q and qb operating a driving signal and a second node of the capacitor Cn may be connected to a first electrode. In this case, the first electrode connected to the second node of the capacitor Cn may be another first electrode adjacent to the first electrode to which the driving signal is applied. Meanwhile, the second integrating circuit 420 may include an operational amplifier. An operation of the second integrating circuit 420 may be controlled by connecting the switches q and qb to an inverting terminal of the operational amplifier. A capacitor Cf_n included in the second integrating circuit 420 may be charged or discharged according to a change in capacitance generated due to noise in the first electrode. The second integrating circuit 420 may generate an output voltage Vout.n from an amount of change in capacitance generated due to noise in the first electrode. Meanwhile, a driving signal −VDD having a negative value may be applied to the second integrating circuit 420 to generate an output signal. In this case, an output potential difference ΔVout.n of the operational amplifier generated due to charge in the capacitor Cf_n may be represented by the following Equations 1 and 2.

$$\Delta Vout.n = \frac{Cn}{Cf\_n} \cdot (-VDD) + \frac{Cp,2}{Cf\_n} \cdot Vnoise \qquad \text{Equation 1}$$

$$\Delta Vout.n = \frac{Cn}{Cf\_n} \cdot (-VDD) + \frac{Cp,2}{Cf\_n} \cdot Vnoise \qquad \text{Equation 2}$$

Here, Equation 1 relates to an output voltage ΔVout.n during a non-touch period, and Equation 2 relates to an output voltage ΔVout.n during a touch. Vnoise indicates a signal generated by noise, and Cp,2 indicates parasitic capacitance between the first electrode and Vnoise.

Referring to FIG. 5, a first integrating circuit 510 may include a variable capacitor Cdiff, switches q, qb, and Tx_in, a capacitor Cf, and an operational amplifier, wherein the operational amplifier has an inverting terminal connected to a second electrode. The switches q and qb may be connected to the inverting terminal of the operational amplifier to control an operation of the first integrating circuit 510. The capacitor Cf included in the first integrating circuit 510 may be charged or discharged according to an amount of change in capacitance generated in the second electrode. The first integrating circuit 510 may generate an output voltage Vout.p from the amount of change in capacitance generated in the second electrode. The capacitor Cf and the switch Tx_in may be connected in parallel with each other and the operational amplifier may be reset in the case in which the switch Tx_in is turned on. In this case, an output potential difference ΔVout.p of the operational amplifier generated due to charge in the capacitor Cf may be represented by the following Equations 3 and 4.

$$\Delta Vout.p = \frac{Cm - Cdiff}{Cf} \cdot (VDD) + \frac{Cp,1}{Cf} \cdot Vnoise \qquad \text{Equation 3}$$

$$\Delta Vout.p = \frac{Cm - Cdiff}{Cf} \cdot (VDD) + \frac{Cp,1}{Cf} \cdot Vnoise \qquad \text{Equation 4}$$

Here, Equation 3 relates to an output voltage ΔVout.p during a non-touch period, and Equation 4 relates to an output voltage ΔVout.p during a touch. Vnoise indicates a signal generated by noise, and Cp,1 indicates parasitic capacitance between the second electrode and Vnoise.

The first integrating circuit 510 may include a variable capacitor Cdiff so that an output value thereof by the change in capacitance (corresponding to a capacitance value of Cm in Equation 3) generated in the second electrode during a non-touch period may be controlled to be 0. That is, a capacitance value of the variable capacitor Cdiff may be controlled to allow a value of the output potential difference ΔVout.p during the non-touch period to only include a voltage value output by noise.

A difference between the output voltage ΔVout.p of the first integrating circuit 510 and the output voltage ΔVout.n of the second integrating circuit 420 may be calculated to remove a noise signal. A final output potential difference ΔVout, equal to a difference between the output voltage ΔVout.p of the first integrating circuit 510 and the output voltage ΔVout.n of the second integrating circuit 420 during the non-touch period may be represented by Equation 5.

$$\Delta Vout = \Delta Vout, p - \Delta Vout, n = \left(\frac{Cp,1}{Cf} - \frac{Cp,2}{Cf\_n}\right) \cdot Vnoise \qquad \text{Equation 5}$$

In addition, a final output potential difference ΔVout equal to a difference between the output voltage of the first integrating circuit and the output voltage of the second integrating circuit during the touch may be represented by Equation 6.

$$\Delta Vout = \Delta Vout,$$

$$p - \Delta Vout, n = VDD \cdot \left(\frac{Ct}{Cf} + \frac{Cn}{Cf\_n}\right) + \left(\frac{Cp,1}{Cf} - \frac{Cp,2}{Cf\_n}\right) \cdot Vnoise \qquad \text{Equation 6}$$

Reviewing Equations 5 and 6, in the final output potential difference ΔVout, in the case in which a value of the parasitic capacitance Cp,2 between the first electrode and Vnoise and a value of the parasitic capacitance Cp,1 between the second electrode and Vnoise are different from each other, a magnitude of noise detected through the output of the first integrating circuit 510 and a magnitude of noise detected through the output of the second integrating circuit 420 are different from each other. Therefore, when subtraction is performed on two output signals, signal distortion may occur. However, according to the embodiment of the present invention, in the case in which noise is not present, the output value of the first integrating circuit 510 may constantly be 0 through the variable capacitor Cdiff of the first integrating circuit 510. That is, the capacitor Cf_n of the second integrating circuit 420 may be controlled to thereby control magnitudes of the output signals detected by the parasitic capacitors Cp,1 and Cp,2 to be same as each other.

Therefore, ΔVout of Equation 5 may be 0, ΔVout of Equation 6 may be (Ct/Cf)VDD, and a voltage difference between the output voltage of the first integrating circuit and the output voltage of the second integrating circuit may be calculated to remove noise.

FIGS. 6A through 7D are views describing a touch sensing method according to an embodiment of the present invention.

Figure 6A:
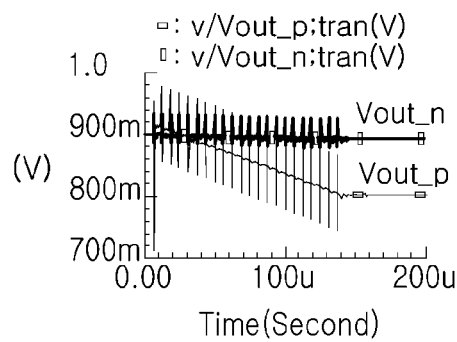
FIGS. 6A through 7D are views describing a touch sensing method according to an embodiment of the present invention.
Figure 6B:
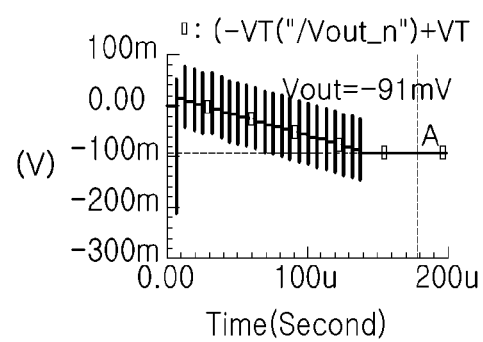
Figure 6C:
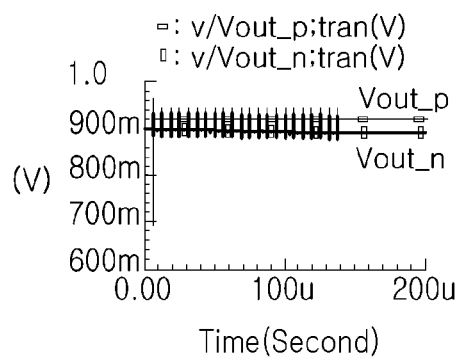
Figure 6D:
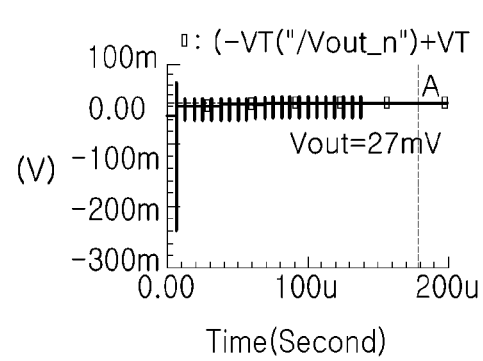

FIG. 6A is a graph showing an integrating result of the first and second integrating circuits when noise is not introduced thereto and a touch occurs; and FIG. 6B is a graph showing a final output result generated by calculating a difference between Voup_n and Vout_p of FIG. 6A. FIG. 6C is a graph showing an integrating result of the first and second integrating circuits when noise is not introduced thereto and a touch does not occur; and FIG. 6D is a graph showing a final output result generated by calculating a difference between Voup_n and Vout_p of FIG. 6C.

Figure 7A:
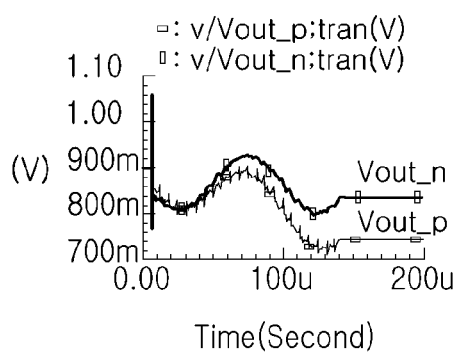
Figure 7B:
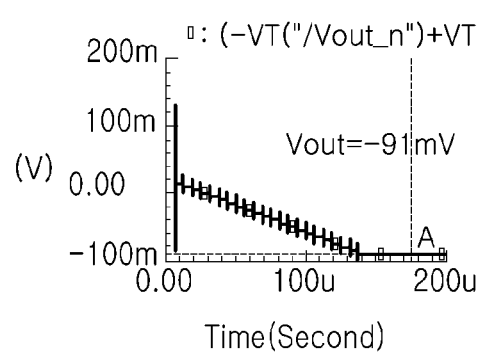
Figure 7C:
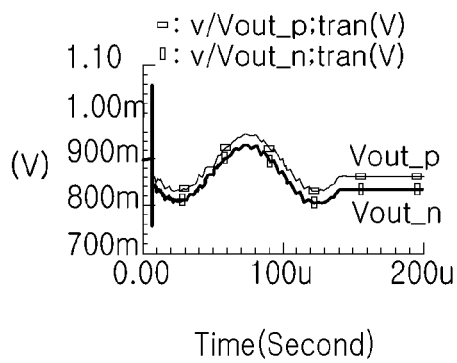
Figure 7D:
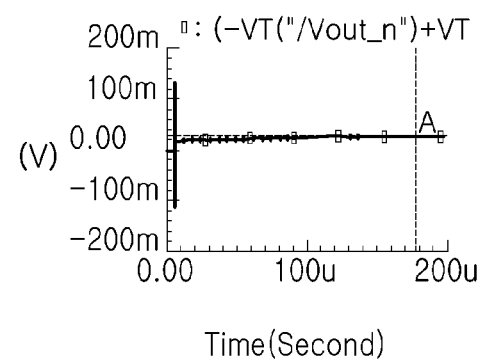

FIG. 7A is a graph showing an integrating result of the first and second integrating circuits when noise is introduced and a touch occurs; and FIG. 7B is a graph showing a final output result generated by calculating a difference between Voup_n and Vout_p of FIG. 7A. FIG. 7C is a graph showing an integrating result of the first and second integrating circuits when noise is introduced and a touch does not occur; and FIG.

7D is a graph showing a final output result generated by calculating a difference between Voup_n and Vout_p of FIG. 7C.

Comparing FIGS. 6A and 7A with each other, it may be appreciated that in the outputs of the first and second integrating circuits, influences according to whether or not noise is introduced are obvious. However, comparing FIGS. 6B and 7B with each other, it may be appreciated that final outputs generated by calculating a difference between the outputs of the first and second integrating circuits are substantially similar to each other regardless of whether or not noise is introduced.

As set forth above, according to embodiments of the present invention, a voltage difference between an output voltage of a first integrating circuit connected to a second electrode and an output voltage of a second integrating circuit connected to a first electrode is integrated and output, whereby the influence of noise may be removed.

While the present invention has been shown and described in connection with the embodiments, it will be apparent to those skilled in the art that modifications and variations can be made without departing from the spirit and scope of the invention as defined by the appended claims.

What is claimed is:

1. A capacitance sensing apparatus comprising:
a driving circuit unit to sequentially apply a driving signal to each of a plurality of first electrodes including a first electrode;
a sensing circuit unit including a first integrating circuit to detect a first change in capacitance generated in at least one of a plurality of second electrodes by the driving signal and a second integrating circuit connected to another first electrode of the plurality of first electrodes adjacent to the first electrode to which the driving signal is applied; and
an operating unit connected to the sensing circuit unit to determine a touch input,
the second integrating circuit detects a second change in capacitance generated due to noise, which is created by the driving signal being applied to the first electrode, in the another first electrode, and
the operating unit determines the touch input based on the first change in capacitance, which is generated in the at least one of the plurality of second electrodes, and the second change in capacitance, which is generated in the another first electrode.

2. The capacitance sensing apparatus of claim 1, wherein the first integrating circuit includes a variable capacitor and a non-inverting amplifier, the variable capacitor being controlled to allow an output value of the non-inverting amplifier to be 0 when noise is not introduced thereto.

3. The capacitance sensing apparatus of claim 1, wherein the second integrating circuit inverts and integrates the second change in capacitance.

4. The capacitance sensing apparatus of claim 1, further comprising a controlling unit performing a control operation such that the driving signal is sequentially applied to the plurality of first electrodes and the second integrating circuit is connected to the another first electrode adjacent to the first electrode to which the driving signal is applied.

5. The capacitance sensing apparatus of claim 1, wherein the detected second change in capacitance in the another first electrode, which is generated due to noise created by the driving signal being applied to the first electrode, is detected during a period when no driving signal is applied to the another first electrode.

6. The capacitance sensing apparatus of claim 1, wherein the sensing circuit unit further includes a subtractor calculating a voltage difference between an output voltage of the first integrating circuit and an output voltage of the second integrating circuit.

7. The capacitance sensing apparatus of claim 6, wherein the operating unit determines the touch input based on an output signal of the subtractor.

8. A capacitance sensing method comprising:
applying a driving signal to a first electrode of a plurality of first electrodes;
generating a first output voltage from a first change in capacitance generated in a plurality of second electrodes by the driving signal;
generating a second output voltage from a second change in capacitance generated due to noise in another first electrode of the plurality of first electrodes which is adjacent to the first electrode to which the driving signal is applied;
calculating a voltage difference between the first output voltage and the second output voltage; and
determining a touch input based on the calculated voltage difference.

9. The capacitance sensing method of claim 8, wherein the generating of the first output voltage is performed by non-inverting and integrating the first change in capacitance.

10. The capacitance sensing method of claim 8, wherein the generating of the first output voltage further includes controlling a variable capacitor to allow the first output voltage to be 0 when noise is not introduced thereto.

11. The capacitance sensing method of claim 8, wherein the generating of the second output voltage is performed by inverting and integrating the second change in capacitance.

12. A touch screen apparatus comprising:
a panel unit including a plurality of driving electrodes and a plurality of sensing electrodes;
a driving circuit unit applying a driving signal to each of the plurality of driving electrodes;
a sensing circuit unit sensing changes in capacitance generated in intersections between the plurality of driving electrodes to which the driving signal is applied and the plurality of sensing electrodes; and
a controlling unit controlling operations of the driving circuit unit and the sensing circuit unit,
the sensing circuit unit including first and second integrating circuits, the first integrating circuit detecting a first change in capacitance generated in the plurality of sensing electrodes by the driving signal and the second integrating circuit detecting a second change in capacitance generated due to noise in another driving electrode adjacent to the driving electrode to which the driving signal is applied.

13. The touch screen apparatus of claim 12, wherein the first integrating circuit includes a variable capacitor and a non-inverting amplifier, the variable capacitor being controlled to allow an output value of the non-inverting amplifier to be 0.

14. The touch screen apparatus of claim 12, wherein the sensing circuit unit calculates a voltage difference between an output voltage of the first integrating circuit and an output voltage of the second integrating circuit to generate an output signal to be input to the controlling unit.

15. The touch screen apparatus of claim 12, wherein the controlling unit performs a control operation so that the second integrating circuit is connected to the another driving electrode adjacent to the driving electrode to which the driving signal is applied.

* * * * *